US012776484B2

(12) United States Patent
Kuhlbusch et al.

(10) Patent No.: US 12,776,484 B2
(45) Date of Patent: Oct. 27, 2026

(54) SYSTEM AND METHOD FOR DELIVERY OF AN ANALYTE AND A REFERENCE

(71) Applicant: Thermo Fisher Scientific (Bremen) GmbH, Bremen (DE)

(72) Inventors: Nils Kuhlbusch, Bremen (DE); Andreas Hilkert, Bremen (DE)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 195 days.

(21) Appl. No.: 18/393,255

(22) Filed: Dec. 21, 2023

(65) Prior Publication Data

US 2024/0213010 A1 Jun. 27, 2024

(30) Foreign Application Priority Data

Dec. 22, 2022 (GB) ...................................... 2219577

(51) Int. Cl.
*H01J 49/04* (2006.01)

(52) U.S. Cl.
CPC ................................ *H01J 49/0431* (2013.01)

(58) Field of Classification Search
CPC .................................................. H01J 49/0431
See application file for complete search history.

(56) References Cited

U.S. PATENT DOCUMENTS 4,207,465 A 6/1980 Favre et al.
11,515,135 B1 11/2022 Wiederin et al.
2024/0112901 A1* 4/2024 Liu ....................... H01J 49/165

FOREIGN PATENT DOCUMENTS

EP 2572188 11/2011

OTHER PUBLICATIONS

Combined Search and Examination Report for related Application No. GB 2219577.0, 6 pages, mailed Jun. 20, 2023.
Extended European search report for Application No. GB 2321887 4.8, dated May 22, 2024.
Examination Report for Application No. GB 2219577.0, 2 pages, dated Sep. 30, 2024.
White, “Viscous Flow in Ducts,” in Fluid Mechanics 4th Edition, Ch. 6, pp. 325-426 (1999).

* cited by examiner

*Primary Examiner* — Nicole M Ippolito
(74) *Attorney, Agent, or Firm* — Klarquist Sparkman, LLP

(57) ABSTRACT

An analyte and a reference substance are delivered to measurement apparatus. An analyte supplies an analyte sample comprising the analyte. A reference supply supplies a reference sample comprising the reference substance. An autosampler, having a storage loop into which a fluid can be loaded, is connected to the analyte supply and connected to the reference supply. The autosampler is switchable between a first configuration and a second configuration. In the first configuration, the analyte sample is loaded into the storage loop, whilst the reference sample passes through the autosampler bypassing the storage loop and being directed towards the measurement apparatus. In the second configuration, the reference sample is directed through the storage loop of the autosampler to displace the analyte sample loaded in the storage loop and thereby inject the analyte sample towards the measurement apparatus.

15 Claims, 5 Drawing Sheets

SYSTEM AND METHOD FOR DELIVERY OF AN ANALYTE AND A REFERENCE

FIELD OF THE DISCLOSURE

A system and method for delivery of an analyte and a reference substance to measurement apparatus. The system may be a sample delivery system, with the analyte and the reference substance being in a liquid phase or in a liquid carrier. In an example, the measurement apparatus is a mass spectrometer. Further described is a method for isotope ratio mass spectrometry.

BACKGROUND TO THE DISCLOSURE

Autosamplers are apparatus for automated delivery of samples. They are used in a wide variety of scientific measurements, including for delivery of a measured quantity of a sample to an analyser or detector for analysis. In a specific example, an autosampler can be used to deliver a quantity of sample to a mass spectrometer. Within isotope ratio mass spectrometry, measurements of an analyte may be interspersed with measurements of a reference sample. A more accurate isotope ratio determination can be achieved by comparison of the analyte and the reference measurements.

Various types of autosampler are currently available. One type is a loop autosampler. FIGS. 1A-1B show the basic components of a loop autosampler 12, as known from the prior art. A solvent, a reference sample and an analyte sample are supplied to the loop autosampler, and the loop autosampler comprises a multi-way valve 14 to control the injection of each substance towards measurement apparatus 20. FIG. 1A shows the loop autosampler 12 in a loading configuration, and FIG. 1B shows the loop autosampler 12 in an injection configuration.

Referring to FIGS. 1A-1B, liquid solvent is stored in solvent reservoir 36 and supplied to the loop autosampler via a solvent supply 37. The solvent (which could be a carrier fluid, or mobile phase) is employed to clean and flush channels within the system and is also used to displace a portion of a sample loaded into the autosampler, to cause it to be ejected. From the solvent supply 37, the solvent is input to the loop autosampler and passed to an (optional) degasser 38, through a pump 40 and towards a solvent inlet 30 at the multi-way valve 14. A sample (being either an analyte sample or a reference sample) is stored in a sample reservoir (either an analyte sample reservoir 32 or reference sample reservoir 34), which is connected to a sample inlet or port 16 at the multi-way valve 14 via an analyte supply 33 or reference supply 35. The multi-way valve 14 further comprises an outlet or delivery port 18, through which liquid passes towards the measurement apparatus 20 (for instance, being a mass spectrometer, chromatography column, or other detector). A waste outlet port 22 is connected to a waste or drain 42. Finally, a storage loop 28 is connected between an outlet port (or loop load port) 24 and an inlet port (or loop exit port) 26 at the multi-way valve 14. The storage loop 28 is a portion of tubing of specific and predetermined length and cross-section, in order to hold a particular volume of fluid.

When the autosampler 12 is in use, the multi-way valve 14 may be arranged in one of two positions. In a first position (the 'load position', as shown in FIG. 1A), the multi-way valve 14 is arranged so that the sample inlet 16 is connected to the loop load port 24, and the loop exit port 26 is connected to the waste port 22. Simultaneously, the solvent inlet 30 is connected to the delivery port 18. In this position, the sample (being an analyte sample or a reference sample, depending on whether the analyte supply 33 or reference supply 35 is connected to sample inlet 16) is loaded into the storage loop 28, with any fluid previously within the storage loop 28 being displaced and pushed to the waste 42. At the same time, the solvent is pumped through the multi-way valve 14 and out of the delivery port 18 towards the measurement apparatus 20. This solvent 'flushes' the system, for instance.

In a second position (the 'load position', as shown in FIG. 1B), the multi-way valve 14 is arranged such that the solvent inlet 30 is connected to the loop load port 24, and the loop exit port 26 is connected to the delivery port 18. In this configuration, solvent may be pumped (via the pump 40 at the solvent line prior to the multi-way valve 14) to pass through the storage loop 28, thereby displacing any sample previously loaded into the storage loop 28 and pushing the sample out through the loop exit port 26 and subsequent delivery port 18. The quantity of the sample ejected from the storage loop 28 can be controlled by changing the volume of solvent passed into the storage loop 28, having a maximum quantity equal to the whole volume of the storage loop 28.

Where an autosampler is used to deliver a sample to a mass spectrometer for measurements such as isotope ratio mass spectroscopy, the autosampler may load and inject a sample being either an analyte sample or a reference sample into a mass spectrometer (wherein the mass spectrometer is the measurement apparatus 20). Between injection of each of the analyte sample or reference sample, solvent is passed through the system during the sample loading phase (such as when the autosampler is in the position shown in FIG. 1B). In view of the periods of flushing and loading, measurements of successive analyte samples interspersed with measurements of reference samples can be time consuming.

FIG. 2 shows a plot of the relative abundance of ions measured for the purposes of isotope ratio mass spectrometry and using the apparatus described in FIGS. 1A-1B. The measurement includes comparison of an analyte and a reference sample. A first period 1100 is an injection period for the reference sample, during which the system is in the configuration shown in FIG. 1B. Prior to the first period, the reference sample has previously been loaded into the storage loop of the autosampler (by connection of the reference supply to sample inlet 16 whist the apparatus is in the configuration of FIG. 1B). In the first period, the relative abundance is high, reflecting the presence of ions of the reference substance.

A second period 1200 in FIG. 2 is a loading period for the next sample to be supplied to the mass spectrometer, which would be an analyte sample. During the loading period, for the analyte sample the analyte supply 33 is connected to the sample inlet 16 and the analyte sample is loaded into the sample loop 28 whilst the solvent passes to the measurement apparatus 20, as shown in FIG. 1A. In second period 1200, the relative abundance of ions is low, as the solvent contains no ions forming part of the analysis at the mass spectrometer. It can be seen that the second period 1200 is essentially redundant for the purposes of the isotope ratio mass spectrometry measurement, and instead functions merely as a loading period for the sample.

A third period 1300 in FIG. 2 is the injection period for the analyte sample, during which the system is in the configuration of FIG. 1B and the analyte sample loaded during second period 1200 is ejected from the storage loop. In the third period 1300, the measured relative abundance is high once again due to the presence of analyte ions.

During the first 1100 and the third 1300 periods the sample supplied is either the analyte sample or a reference sample. A user of the apparatus may select whether the sample loaded at the storage loop of the autosampler is the analyte or the reference, for instance by changing a reservoir connected to the sample supply. Therefore, some user input is typically required, and such measurements are not straightforward to automate in view of the need to periodically connect and disconnect different sample reservoirs to the sample inlet of the autosampler.

In view of the above, an improved system for delivery of an analyte and a reference substance to measurement apparatus would be of value.

SUMMARY OF THE DISCLOSURE

In a first aspect there is a system for delivery of an analyte and a reference substance to measurement apparatus, comprising:

- an analyte supply, for supplying an analyte sample comprising the analyte;
- a reference supply, for supplying a reference sample comprising the reference substance;
- an autosampler, having a storage loop into which a fluid can be loaded, the autosampler connected to the analyte supply and connected to the reference supply, the autosampler being switchable between a first configuration and a second configuration, wherein
  - in the first configuration, the analyte sample is loaded into the storage loop, whilst the reference sample passes through the autosampler bypassing the storage loop and being directed towards the measurement apparatus; and
  - in the second configuration, the reference sample is directed through the storage loop of the autosampler to displace the analyte sample loaded in the storage loop and thereby inject the analyte sample towards the measurement apparatus.

In a second aspect there is a method for delivery of an analyte and a reference substance to measurement apparatus, comprising:

- switching an autosampler between a first configuration and a second configuration, the autosampler being connected to an analyte supply, supplying an analyte sample comprising the analyte, and the autosampler being connected to a reference supply, supplying a reference sample comprising the reference substance, wherein
  - in the first configuration, the analyte sample is loaded into a storage loop, whilst the reference sample passes through the autosampler bypassing the storage loop and being directed towards the measurement apparatus; and
  - in the second configuration, the reference sample is directed through the storage loop of the loop autosampler to displace the analyte sample loaded in the storage loop and thereby inject the analyte sample towards the measurement apparatus.

In a third aspect there is apparatus for isotope ratio mass spectrometry, comprising:

- a mass spectrometer; and
- the system as described above, wherein the measurement apparatus is the mass spectrometer;
- the system being configured to deliver an analyte or a reference substance to a sample input of the mass spectrometer.

In a fourth aspect there is a method for isotope ratio mass spectroscopy, comprising:

- arranging a system as described above in the first configuration for delivery and measurement of the reference sample, wherein the measurement apparatus is a mass spectrometer;
- arranging the system in the second configuration for delivery and measurement of the analyte, wherein the measurement apparatus is the mass spectrometer; and
- determining an isotope ratio of the analyte by comparison of a measurement of the analyte sample with a measurement of the reference sample.

BRIEF DESCRIPTION OF THE FIGURES

The invention may be put into practice in various ways, some of which will now be described by way of example only and with reference to the accompanying drawings in which:

FIG. 1A shows the loop autosampler in a 'sample load' configuration; whereas FIG. 1B shows the loop autosampler in a 'sample injection' configuration;

FIG. 3A shows the system in the 'sample load' configuration; whereas FIG. 3B shows the system in the 'sample injection' configuration;

It will be understood that like features are labelled using like reference numerals. The figures are not to scale.

DETAILED DESCRIPTION OF SPECIFIC EMBODIMENTS

This disclosure describes a method and a system for delivery of an analyte and a reference substance to measurement apparatus. The system may be considered a sample delivery system or sample delivery interface. The disclosed method and system use an autosampler, for instance having a structure as described above with respect to FIGS. 1A and 1B. However, the operation of the autosampler, and the fluids passed through the autosampler, are different than compared to the autosampler described with respect to FIG. 1A and FIG. 1B. Any type of autosampler having a storage loop and multi-way valve could be used. The measurement apparatus may be any apparatus required for a further stage of measurement, including but not limited to a mass spectrometer, or another type of spectroscopic analyser and/or detector.

Figure 3A:
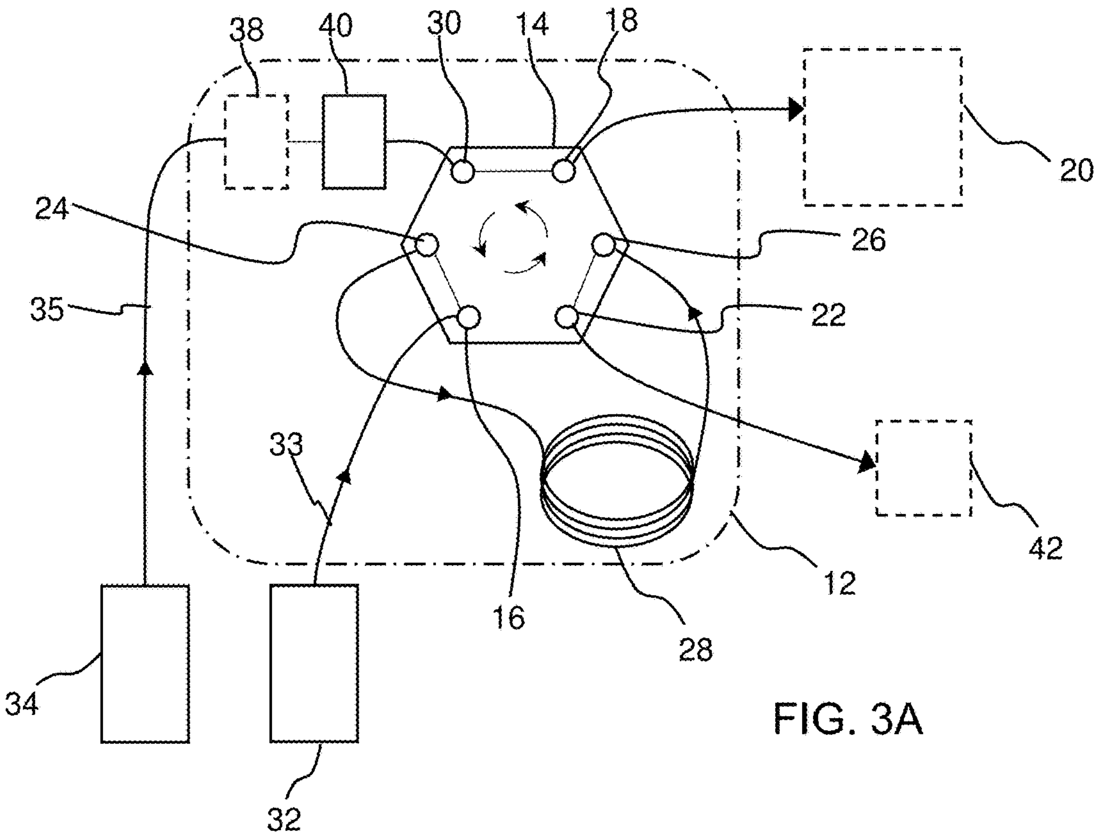
FIGS. 3A-3B are a schematic diagram showing a system for delivery of an analyte and a reference substance to measurement apparatus according to the present disclosure.
Figure 3B:
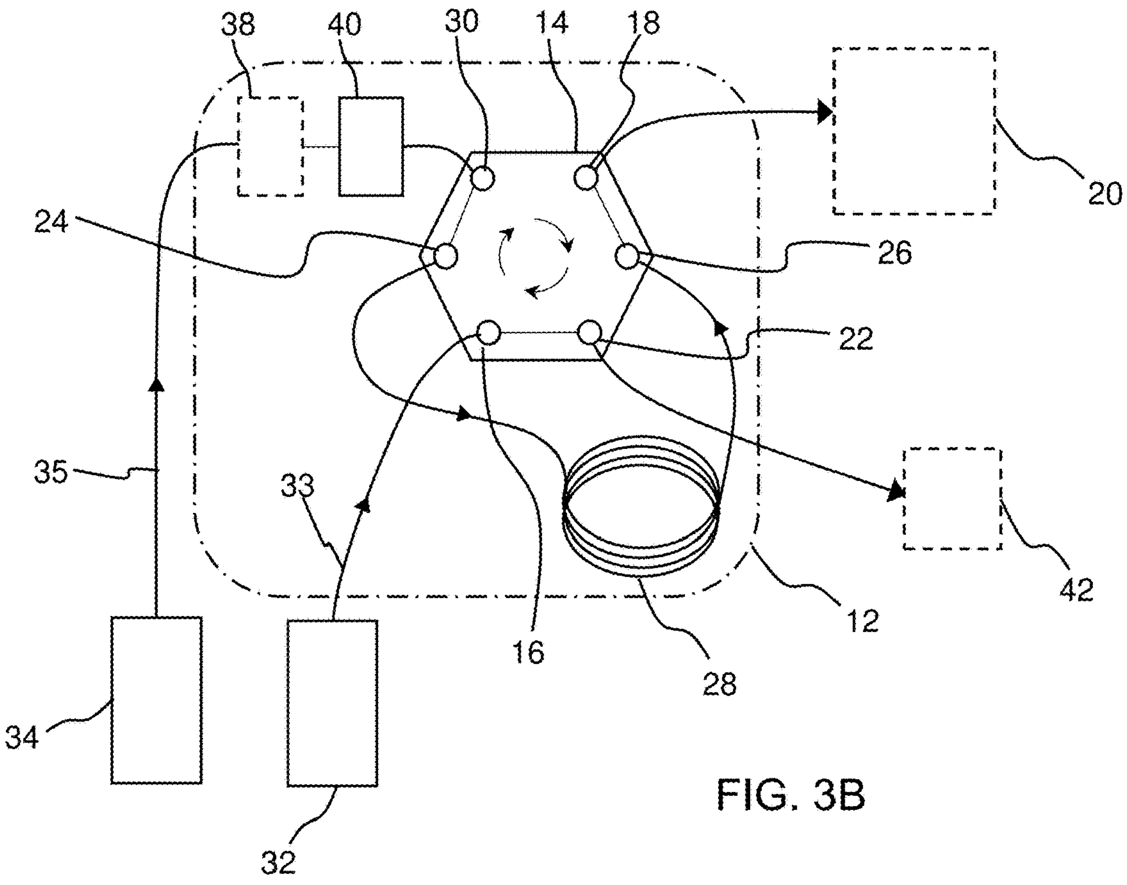

The system according to the invention is shown in FIGS. 3A-3B, including a loop autosampler 12, an analyte sample reservoir 32 connected to the loop autosampler 12 by analyte supply 33 and a reference sample reservoir 34 connected to the loop autosampler 12 by analyte supply 35. The loop autosampler 12 may be switchably arranged in one of two configurations. FIG. 3A shows the loop autosampler in an 'analyte loading' configuration, and FIG. 3B shows the loop autosampler in an 'analyte injection' configuration. The analyte sample and the reference sample are fluids. In the described example, the analyte sample and the reference sample are liquids, with the analyte and the reference substance provided either in a liquid carrier, or in the liquid phase. However, it will be understood that the analyte sample and the reference sample could be a gas (either having the analyte or reference substance in the gas phase, or within a gas carrier).

A switchable multi-way valve 14 at the loop autosampler 12 comprises ports as previously described. Namely, the multi-way valve 14 of the loop autosampler comprises a sample inlet port 16 (here being an analyte inlet port only, as noted below), a delivery port 18 for passage towards measurement apparatus 20 (including towards a detector, towards a mass spectrometer, or towards a detector via a liquid chromatography column), a waste outlet port 22, and an outlet port (loop load port) 24 and an inlet port (loop exit port) 26 having a storage loop 28 connected therebetween. The multi-way valve 14 also comprises a further inlet port 30, which was previously considered as a solvent inlet port. However, in the present system this port 30 allows for input of a reference substance (either as a reference substance in the liquid phase, or as a reference substance in a carrier liquid) and so in the present system can be considered as a reference sample inlet port 30.

Figure 1A:
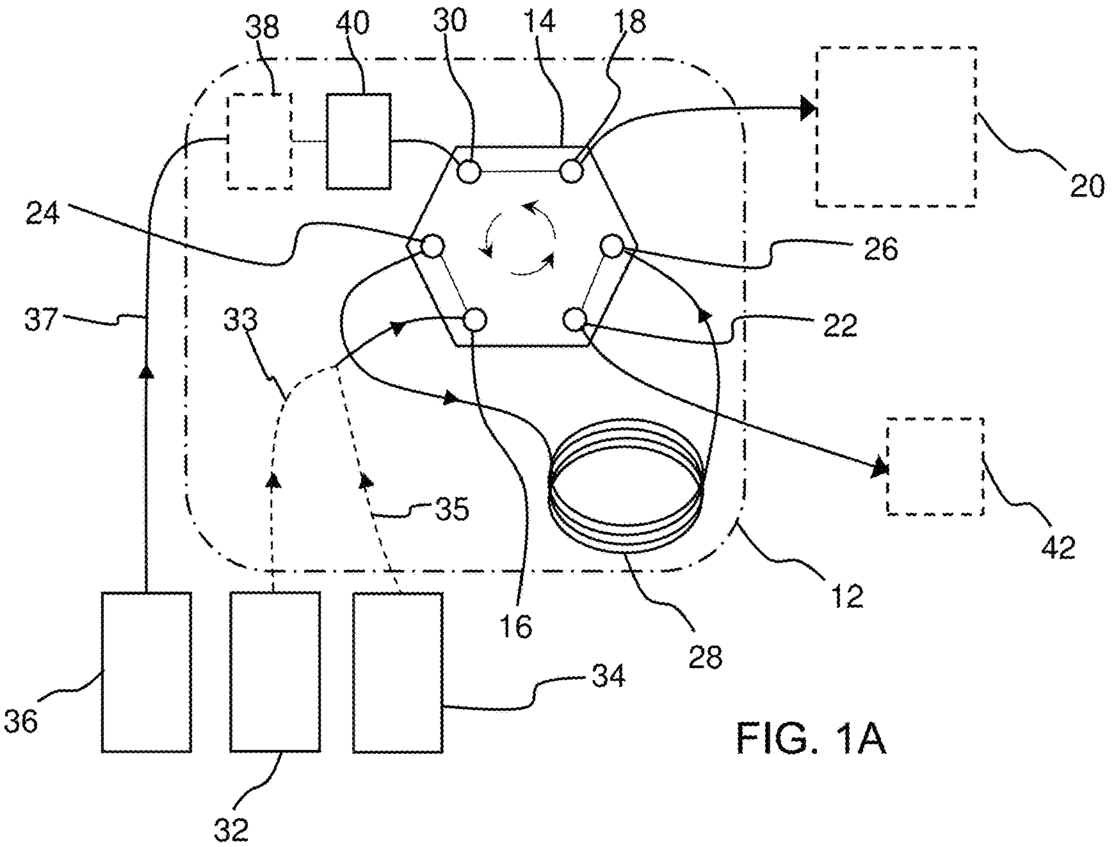
FIGS. 1A-1B are a schematic diagram showing a loop autosampler according to the prior art.
Figure 1B:
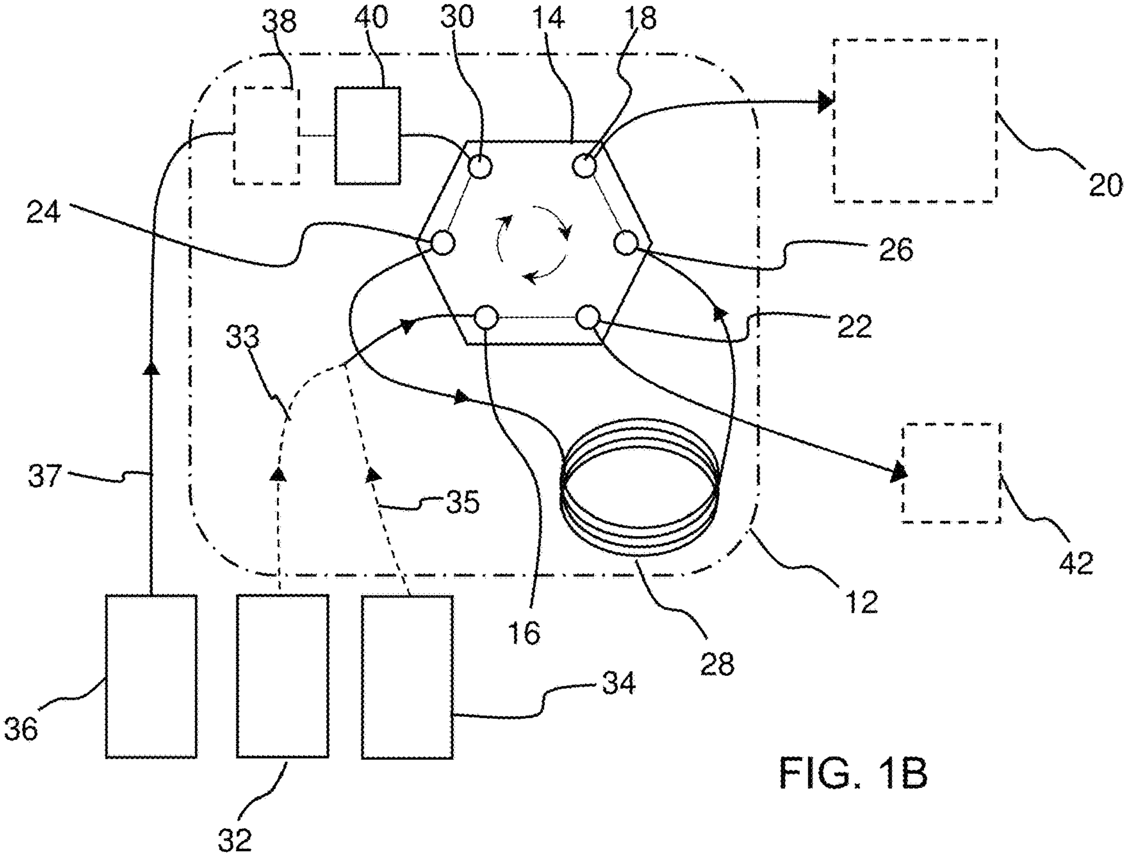

Notably, whereas in the system shown in FIGS. 1A-1B the sample inlet 24 provides passage into the storage loop 28 of either an analyte sample or a reference sample, in the presently described method and system of FIGS. 3A-3B the sample inlet 24 provides passage into the storage loop 28 of the analyte sample only. Furthermore, in the method and system of FIGS. 3A-3B the reference substance is comprised within the fluid passed through the pump 40 from the reference reservoir 34, in place of the solvent supplied through the same pathway in the system of FIGS. 1A-1B. In the presently disclosed system and method, no user input would be required to change the sample to be loaded between an analyte sample to a reference sample (for instance, by swapping the reservoir connected to the sample inlet). Instead, delivery of an analyte or reference sample to the measurement apparatus is controlled wholly by the position of the multi-way valve 14.

In the system of FIGS. 3A-3B, the switchable multi-way valve 14 can be arranged to occupy a first position or a second position. In the first position shown in FIG. 3A, the autosampler 12 can be considered to be in an 'analyte loading' position. Here, the reference sample inlet 30 is connected to the delivery port 18 via reference supply 35, so that the reference sample is pumped through the multi-way valve 14 towards the measurement apparatus 20 whilst bypassing the storage loop 28. At the same time, the analyte sample is passed from the analyte reservoir 32 via analyte supply 33 and through the sample inlet 16 at the multi-way valve 14. The sample inlet 16 is connected to the loop load port 24, to allow the analyte sample to be loaded into the storage loop 28. Any fluid within the storage loop 28 prior to loading of the analyte sample is pushed through the loop exit port 26, and then out of the waste port 22 to waste 42. Any overflow of the analyte after filling of the volume of the storage loop 28 will also be passed through the multi-way valve 14 to waste 42.

When the multi-way valve 14 is in the second position shown in FIG. 3B, the loop autosampler 12 can be considered to be in an 'analyte injection' position. The reference sample inlet 30 at the multi-way valve 14 is coupled to the loop load port 24, and the loop exit port 26 is connected to the delivery port 18. In this configuration the reference sample is pumped via the reference supply 35 from the reference reservoir 34 into the storage loop 28 at the multi-way valve 14, thereby displacing and pushing the previously loaded analyte sample out of the storage loop 28, back through the multi-way valve 14 and out of the delivery port 18 towards the measurement apparatus 20. In the meantime, the analyte sample inlet 16 is connected directly to the waste 42, in order to carry any excess from the sample reservoir 32. Optionally, when the multi-way valve 14 is in the second position a flow of the analyte sample into the multi-way valve 14 (to pass to waste 42) may be reduced (for instance, by closing of an external valve (not shown), or reduction in the flow rate in another way). This prevents unnecessary consumption of the analyte sample. It will be understood that a controller (not shown) may be used to control the position of multi-way valve 14, and any other values with the system (such as a valve at the analyte supply 33 (not shown)).

As such, a method for delivery of an analyte and a reference substance to measurement apparatus using the described system comprises switching the autosampler between a first configuration (the 'analyte loading' position of FIG. 3A and a second configuration (the 'analyte injection' position of FIG. 3B). Changing from the first and second configuration takes place by switching the described multi-way valve between the first position and the second position. Said switching results in either the analyte sample or reference sample to be passed to the delivery outlet at the valve, so as to be passed out of the autosampler and towards the measurement apparatus.

Figure 2:
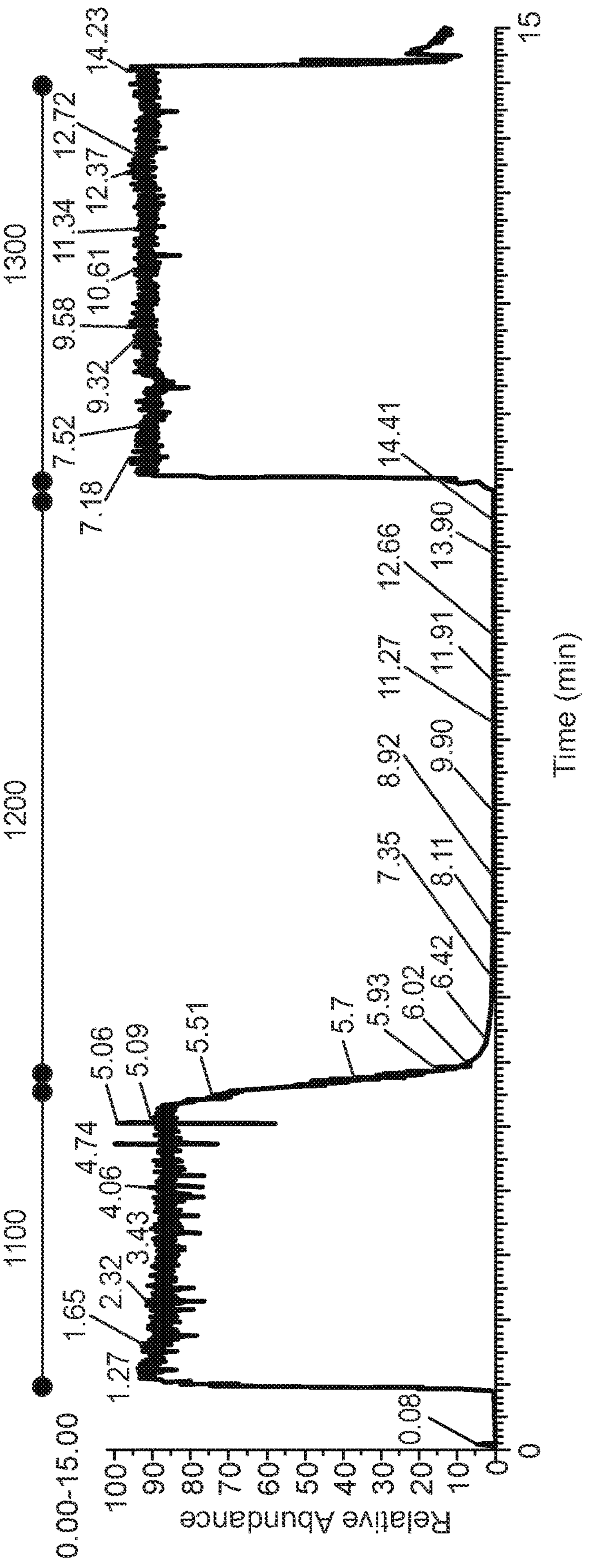
FIG. 2 is an example plot of the relative abundance of ions in an analyte sample and a reference sample measured using the system discussed with reference to FIG. 1.

Thus, the system and method described with reference to FIGS. 3A and 3B is highly efficient, because at all times either an analyte sample or reference sample is being passed through the delivery port 18 and towards the measurement apparatus 20. During the period of loading of the analyte sample into the storage loop 28 of the autosampler 12 (according to the configuration of FIG. 3A), the reference sample is passed through the delivery port 18 for delivery to the measurement apparatus 20. Redundant measurement time at the mass spectrometer due to loading of an analyte or reference sample (such as period 1200 in FIG. 2) is avoided.

In a further benefit, the presently described system passes only two substances to the measurement apparatus—either the analyte sample or the reference sample—in contrast to the three different substances passed to the measurement apparatus in the prior art—being either the analyte sample, the reference sample or a solvent. As a result, the presently described system offers advantages where the measurement apparatus 20 is a mass spectrometer in which the received sample or fluid is ionised, because the frequency of a period of inherent instability that can occur upon change of a substance (for instance, at an electrospray) is reduced.

Figure 4:
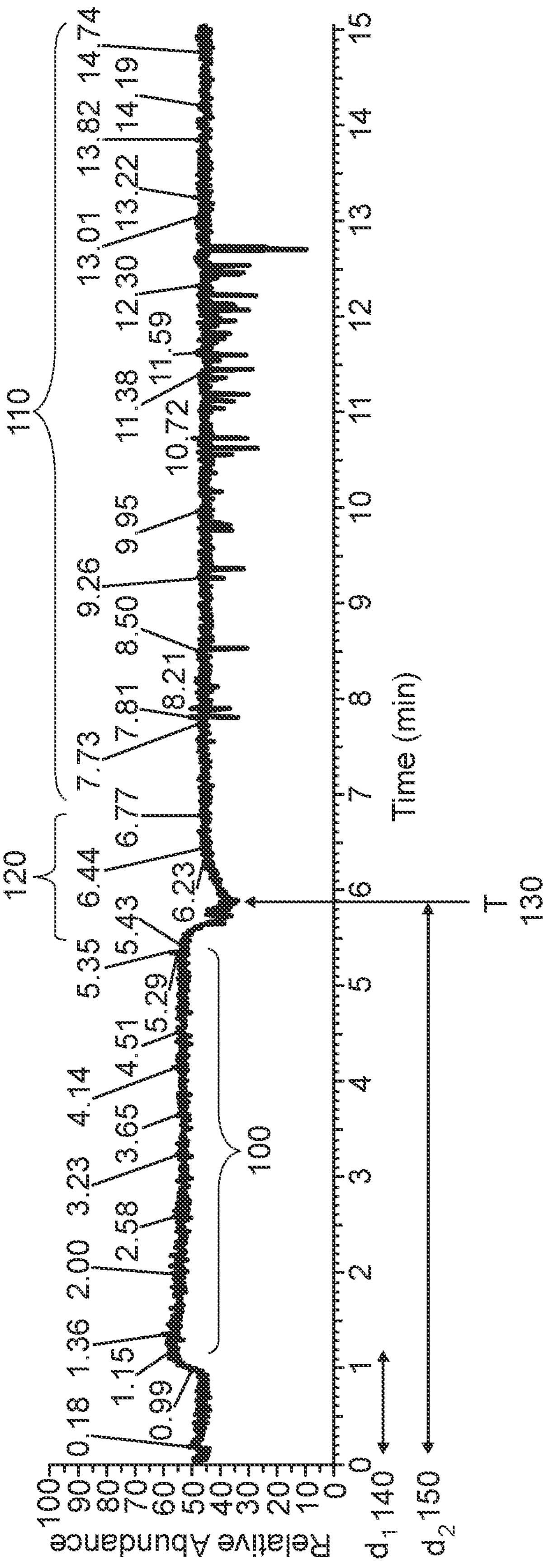
FIG. 4 is an example plot of the relative abundance of ions in an analyte sample and a reference sample measured using the system for delivery of an analyte and a reference substance to measurement apparatus according to the present disclosure.

FIG. 4 shows an example of the relative abundance of isotopes measured at a detector of a mass spectrometer for analyte and reference samples delivered using the system described with reference to FIGS. 3A-3B. Specifically, the data shown in FIG. 4 was recorded using the system as shown in FIGS. 3A-3B when the measurement apparatus 20 is a mass spectrometer. FIG. 4 can be compared to FIG. 2, which shows data for a similar measurement but using the apparatus of FIGS. 1A-1B. It can be seen in the plot of FIG. 4 that there is a first period 100 of the recorded relative abundance data during which the analyte sample is received at the detector, and a second period 110 during which the reference sample is received at the detector. The changeover between the analyte and reference sample is fast, with only a short period 120 of instability upon switching of the type of sample. The plot of FIG. 4 shows very little redundant measurement time (when compared to, for example, the redundant period 1200 for loading a sample in FIG. 2), as the loading period for the analyte instead is used for measurement of the reference sample when using the apparatus of FIGS. 3A-3B.

It will be understood that in the system and method described with respect to FIGS. 3A-3B and 4, there is no flushing of the system between delivery of the analyte sample and delivery of the reference substance into the measurement apparatus. As such, there may be a small amount of mixing of the two solutions upon switching of the valve, which in turn could cause inaccuracy in a measurement during this period of mixing. In view of this, upon analysis of data measured at the measurement apparatus (such as the relative abundance as shown in FIG. 4), a small portion of data recorded for a short period 120 before and/or after switching the multi-way valve 14 may be disregarded for the purposes of analysis of each type of sample. Nevertheless, the short period to be disregarded would still be substantially less than the redundant period of flushing by the solvent that would occur during the loading of a sample (analyte or reference) into the storage loop of the autosampler used as described with reference to FIGS. 1A-1B. This is exemplified by the comparison of period 1200 in FIG. 2 with the much shorter period 120 in FIG. 4.

Although a portion of measured data obtained for a short period 120 around the time of switching of the valve may be disregarded in order to improve the accuracy of the measured data, it is also beneficial to reduce the amount of mixing within the system. This should reduce the amount of data required to be disregarded. A reduction in mixing can be achieved by directing the analyte sample and reference sample through the system under laminar flow (or as close as possible to laminar flow). Laminar flow is characterized by particles within a fluid flowing smoothly through a conduit. The fluid particles can be considered to travel in layers, with each layer moving smoothly past the adjacent layers with little or no lateral mixing. In ideal lateral flow, there are no cross-currents perpendicular to the direction of flow. An alternative to laminar flow is turbulent flow, in which there are substantial eddies and mixing.

The physical properties of a system that leads to laminar flow or turbulent flow can be defined by a number of parameters, including flow rate, fluid viscosity and the cross-sectional area of the pipe or conduit through which the fluid is passed. The Reynolds number is a parameter used to describe flow conditions leading to laminar or turbulent flow. The dimensionless Reynolds number is a measure of how fast the fluid is moving relative to how viscous it is, irrespective of the scale of the fluid system. In particular, $$R = \frac{\rho u D_H}{\mu} = \frac{u D_H}{\nu} = \frac{Q D_H}{\nu A}$$

Wherein R is the Reynolds number; ρ is the density of the fluid (kg/m$^3$); u is the mean speed of the fluid (SI units: m/s); $D_H$ is the hydraulic diameter of the pipe (m); μ is the dynamic viscosity of the fluid (Pa·s=N·s/m$^2$=kg/(m·s)); ν is the kinematic viscosity of the fluid, ν=μ/ρ (m$^2$/s); Q is the volumetric flow rate (m$^3$/s); and A is the pipe's cross-sectional area (m$^2$).

To minimise mixing between the analyte sample and the reference sample in the system of FIGS. 3A-3B, the diameter of the conduits or pipes within the system as well as the flow rate of fluid therethrough (set by the pump rate at pump 40) is selected to achieve a flow as close as possible to laminar flow. The parameters of the system throughout will be of particular relevance for achieving laminar flow, but it will be understood that laminar flow is most important at the regions of the system where mixing might take place. For instance, mixing will be most likely in the storage loop 28 when the reference sample is used to displace the analyte sample, and at the switchable connection provided between the inlet 26 from the storage loop 28 and the delivery port 18 within the multi-way valve 14.

In view of this, in the system and method discussed with reference to FIGS. 3A-3B, the cross-sectional area of the conduits in the system, as well as the pump flow rate, may be selected in view of the viscosity of the analyte and/or the reference sample to achieve substantially laminar flow. Ideally the viscosity of both the analyte sample and reference sample will be the same, or similar (within +5%). The pump rate may be more readily adapted (compared to the size of conduits within the system). As such, the volumetric flow rate may be adjusted to provide substantially laminar flow in view of the given parameters of the system (including the viscosity of the analyte and/or reference sample). Substantially laminar flow maybe provided at a volumetric flow rate, Q, within 20% or more preferably within 10%, of the volumetric flow rate, Q, at which laminar flow occurs for a given sample and system.

Figure 5:
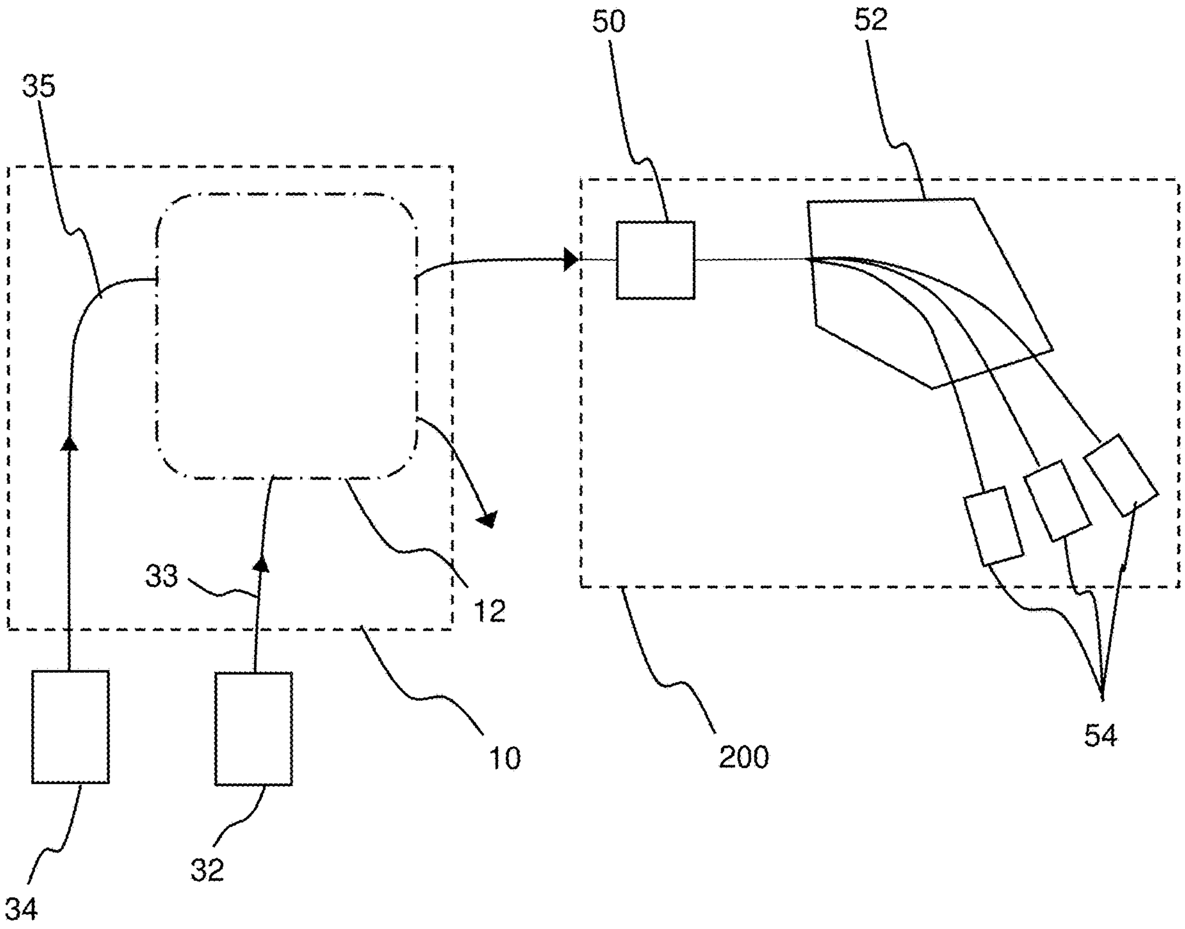
FIG. 5 is a schematic diagram of the disclosed system used for delivery of an analyte and a reference substance to a mass spectrometer.

FIG. 5 shows apparatus for isotope ratio mass spectrometry using the described sample introduction system 10. The system 10 described with respect to FIGS. 3A-3B and FIG. 4 can be used as a sample introduction system or sample introduction interface for measurements at a mass spectrometer 200 (previously represented as measurement apparatus 20). A sample (being either an analyte sample from an analyte reservoir 32 or reference sample from a reference reservoir 34 depending on the position of the multi-way valve at the autosampler 12) is delivered to or introduced into the spectrometer 200 using the system 10 described above with reference to FIGS. 3A-3B. A liquid sample may be ionised upon entry to the mass spectrometer 200 (at an ioniser 50 for instance, by methods such as electrospray ionisation or ambient ionisation techniques) or vapourised and subsequently ionised (using techniques such as electron ionisation or chemical ionisation). After ionisation, the sample is directed using ion optics through a mass analyser 52 (for example, a magnetic analyser) and onwards to one or more detectors 54 (such as Faraday detectors, or solid-state detectors). The abundance of ions within a sample can be determined according to data recorded at the detectors 54.

Also disclosed in the present disclosure is a method for delivery of an analyte and reference substance using the system of FIGS. 3A-3B. There is also described a method of mass spectrometry using the sample delivery system of FIGS. 3A-3B within the apparatus of FIG. 5. Finally, described below is a method for analysis of data recorded at measurement apparatus to which an analyte sample or reference sample is delivered by the system of FIGS. 3A-3B. In line with these method aspects (and any other method aspect discussed herein), a computer program may be provided, comprising instructions that, when executed by a processor, cause the processor to control the system described to perform the corresponding method. A (non-transitory) computer readable medium comprising or storing thereon such a computer program may also be provided.

In particular, a processor at a controller (not shown) may be configured to control the position of multi-way valve 14, and/or any other values within the system (such as a valve at the analyte supply 33 (not shown)) and/or the measurement apparatus 20. The controller may also control the receipt and processing of data recorded at the measurement apparatus 20. For instance, a computer implemented method or computer program may allow the recorded data to be identified as being associated either with a reference sample or an analyte sample.

In one example, a computer implemented method or computer program may be employed to associate certain time periods of received measured data as being measurements of the reference sample or the analyte sample by taking into account one or more predetermined delays, $d_1$ 140 or $d_2$ 150 (shown in FIGS. 3A-3B), between the start of the measurement and a switch in the position of the multi-way valve 14 within the autosampler 12. In another example, a computer implemented method or computer program may identify characteristic peaks or other typical characteristics associated with the analyte and/or the reference in order to identify portions of the data relating to each type of sample. In a still further example, the reference sample may include a substance that generates an indicator peak in an abundance measurement, to act as an indicator of the start of a period of measurement of the reference sample. A computer implemented method or computer program may identify said indicator peak.

In some circumstances, data recorded close to or either side of a time point, T 130, at which the measured sample changes from a reference sample to an analyte sample (or vice versa) may be disregarded during analysis of the data. As noted above, this can account for or avoid any anomalies that may be present in this portion of the data due to a small amount of inadvertent mixing of the reference sample and analyte sample. A computer implemented method or computer program may be configured to automate the process of disregarding appropriate portions of the recorded data.

In still other examples, a computer implemented method or computer program for analysis of the data recorded at the detectors 54 may control the multi-way valve 14 within the autosampler 12. For instance, according to a computer implemented method the multi-way valve 14 at the autosampler 12 may be switched from the second position to the first position once analyte peaks in the measured data are identified (according to the computer implemented method) to have receded. In this situation receding of such peaks would indicate that the entire analyte sample had been displaced from the storage loop 28 of the autosampler 12, and so the reference sample is instead being passed through the delivery port 18 of the multi-way valve 14 via the storage loop 28.

The sample introduction system described with respect to FIGS. 3A-3B and FIG. 4 allows for analyte samples to be passed to the mass spectrometer (being measurement apparatus 20), analysed and detected, whilst interspersed with measurement of a known reference sample. Comparison of the measurements recorded for the analyte and reference sample allow for more precise and accurate determination of the ratio of particular isotopes present in the analyte sample. The described sample introduction system 10 in particular allows for straightforward automated and time efficient switching between delivery of the analyte and the reference sample to the measurement apparatus 20 (for instance, the mass spectrometer).

Although embodiments according to the disclosure have been described with reference to particular types of devices and applications (particularly mass spectrometry) and the embodiments have particular advantages in such case, as discussed herein, approaches according to the disclosure may be applied to other types of device and/or application. Certain features may be omitted or substituted, for example as indicated herein. Each feature disclosed in this specification, unless stated otherwise, may be replaced by alternative features serving the same, equivalent or similar purpose. Thus, unless stated otherwise, each feature disclosed is one example only of a generic series of equivalent or similar features.

In this detailed description of the various embodiments, for the purposes of explanation, numerous specific details are set forth to provide a thorough understanding of the embodiments disclosed. One skilled in the art will appreciate, however, that these various embodiments may be practiced with or without these specific details. Furthermore, one skilled in the art can readily appreciate that the specific sequences in which methods are presented and performed are illustrative and it is contemplated that the sequences can be varied and still remain within the scope of the various embodiments disclosed herein. For instance, the sequencing of the switchable value in either the 'first' or 'second' position of the multi-way valve is arbitrary.

As used herein, including in the claims, unless the context indicates otherwise, singular forms of terms are to be construed as including the plural form and vice versa. For instance, unless the context indicates otherwise, a singular reference herein including in the claims, such as "a" or "an" means "one or more". Throughout the description and claims of this disclosure, the words "comprise", "including", "having" and "contain" and variations of the words, for example "comprising" and "comprises" or similar, mean "including but not limited to", and are not intended to (and do not) exclude other components. Also, the use of "or" is inclusive, such that the phrase "A or B" is true when "A" is true, "B" is true, or both "A" and "B" are true.

The use of any and all examples, or exemplary language ("for instance", "such as", "for example" and like language) provided herein, is intended merely to better illustrate the disclosure and does not indicate a limitation on the scope of the disclosure unless otherwise claimed. No language in the specification should be construed as indicating any non-claimed element as essential to the practice of the disclosure.

The terms "first" and "second" may be reversed without changing the scope of the disclosure. That is, an element termed a "first" element or position may instead be termed a "second" element or position and an element termed a "second" element or position may instead be considered a "first" element or position.

Any steps described in this specification may be performed in any order or simultaneously unless stated or the context requires otherwise. Moreover, where a step is described as being performed after a step, this does not preclude intervening steps being performed.

It is also to be understood that, for any given component or embodiment described herein, any of the possible candidates or alternatives listed for that component may generally be used individually or in combination with one another, unless implicitly or explicitly understood or stated otherwise. It will be understood that any list of such candidates or alternatives is merely illustrative and not limiting, unless implicitly or explicitly understood or stated otherwise.

All literature and similar materials cited in this disclosure, including but not limited to patents, patent applications, articles, books, treaties and internet web pages are expressly incorporated by reference in their entirety for any purpose. Unless otherwise described, all technical and scientific terms used herein have a meaning as is commonly understood by one of ordinary skill in the art to which the various embodiments described herein belongs.

According to the specific examples described above, this disclosure considers a system for delivery of an analyte and a reference substance to measurement apparatus, comprising:

- an analyte supply, for supplying an analyte sample comprising the analyte;
- a reference supply, for supplying a reference sample comprising the reference substance;
- an autosampler, having a storage loop into which a fluid can be loaded, the autosampler connected to the analyte supply and connected to the reference supply, the autosampler being switchable between a first configuration and a second configuration, wherein
  - in the first configuration, the analyte sample is loaded into the storage loop, whilst the reference sample passes through the autosampler bypassing the storage loop and being directed towards the measurement apparatus; and
  - in the second configuration, the reference sample is directed through the storage loop of the autosampler to displace the analyte sample loaded in the storage loop and thereby inject the analyte sample towards the measurement apparatus.

The system is a delivery system of a sample, wherein the sample may be an analyte (being a substance of interest for analysis, which may be an unknown substance) or a reference (being a known substance with known characteristics, to allow for comparison of measured characteristics with the analyte sample). The analyte is comprised within an analyte sample, and the reference substance is comprised within a reference sample. The analyte sample and the reference sample (collectively described as "a sample") are a fluid (e.g. a liquid or gas). For instance, the analyte or reference sample may be provided in a liquid or a gas phase, or be provided in a liquid or gas carrier.

The analyte supply may be any mechanism for supply of the analyte, and the reference sample may be any mechanism for supply of the reference substance. For instance, the supply may be a pipe or conduit connected to a reservoir or a sample syringe.

The autosampler is an instrument for automated supply of a measured, defined volume of a sample. The autosampler in the present disclosure includes a storage loop (being a tube, trap, or vial to contain a fixed volume of fluid), into which a known volume of sample can be loaded and then ejected. The autosampler is switchable between a first and second configuration, where the first configuration is for loading a sample into the sample loop, and the second configuration is for ejecting the sample out of the sample loop (and out of the autosampler). Switching between the first and second configuration may be controlled or automated by use of a programmable controller.

The autosampler may further comprise a valve, wherein the valve is switchable between a first position to enable the first configuration for the autosampler, and a second position to enable the second configuration for the autosampler. The valve may be a multi-way valve (such as a six-way valve). The valve may comprise a plurality of ports, wherein the plurality of ports comprises at least an analyte sample input port connected to the analyte supply, a loop load port, a loop exit port, an analyte sample waste port, a reference sample input port connected to the reference supply, and a delivery port for passage towards the measurement apparatus; wherein the first position for the valve connects the reference sample input port to the delivery port whilst the analyte sample input port is connected to the loop load port and the loop exit port is connected to the analyte sample waste port; and the second position for the valve connects the reference sample input port to the loop load port and connects the loop exit port to the delivery port, whilst the analyte sample input port is connected to the analyte sample waste port. A port being connected to another port means that ports are fluidly connected, to allow for fluid transmission between the said ports.

The system may further comprise a pump for pumping the reference sample through the valve at the loop autosampler. The pump may be of the type common in an LC system or HPLC system. The pumping of the reference sample may be at a volumetric flow rate, Q, to provide substantially laminar flow in view of a kinematic viscosity of the reference sample, ν, a hydraulic diameter, $D_H$, of at least a conduit forming the storage loop, and the cross-sectional area, A, of the conduit forming the storage loop. Laminar flow may be achieved when the Reynolds number, R, for the reference sample is $R=QD_H/\nu A$.

It will be understood that substantially laminar flow may be provided at a volumetric flow rate, Q, that is between 80% and 120% of the volumetric flow rate, Q, at which laminar flow occurs for a reference sample of kinematic viscosity, ν, via a conduit forming the storage loop having hydraulic diameter, $D_H$, and cross-sectional area, A. More preferably, substantially laminar flow may be provided at a volumetric flow rate, Q, that is between 90% and 110%, or even 95% and 105%, of the volumetric flow rate, Q, at which laminar flow occurs for a reference sample of kinematic viscosity, ν, via a conduit forming the storage loop having hydraulic diameter, $D_H$, and cross-sectional area, A. Alternatively, a conduit forming the storage loop may be chosen to have a hydraulic diameter, $D_H$, and cross-sectional area, A, to achieve laminar flow for a given volumetric flow rate, Q, provided by the pump. Although the conduit at the storage loop may be the most significant consideration for laminar flow (being the place where the analyte sample and the reference sample are most likely to mix), ideally other tubes or conduit used for transport of fluid through the system will also have a hydraulic diameter, $D_H$, and cross-sectional area, A to achieve laminar flow for a volumetric flow rate, Q, falling within the parameters above for laminar flow or substantially laminar flow at the storage loop.

The system may further comprise an analyte reservoir, connected to the analyte supply; and/or a reference reservoir, connected to the reference supply. For instance, the analyte reservoir and/or reference analyte may be a bottle, container or syringe for holding an amount of the respective sample.

In another example there is a method for delivery of an analyte and a reference substance to measurement apparatus, comprising:

- switching an autosampler between a first configuration and a second configuration, the autosampler being connected to an analyte supply, supplying an analyte sample comprising the analyte, and the autosampler being connected to a reference supply, supplying a reference sample comprising the reference substance, wherein
  - in the first configuration, the analyte sample is loaded into a storage loop, whilst the reference sample passes through the autosampler bypassing the storage loop and being directed towards the measurement apparatus; and in the second configuration, the reference sample is directed through the storage loop of the loop autosampler to displace the analyte sample loaded in the storage loop and thereby inject the analyte sample towards the measurement apparatus.

The characteristics of features discussed above in relation to the system, will also apply to like features in the method.

Switching an autosampler between a first configuration and a second configuration may comprise switching a valve between a first position to enable the first configuration for the autosampler, and a second position to enable the second configuration for the autosampler. Switching between the first and second configuration may be under the control of a programmable controller.

The method may further comprise pumping the reference sample through the valve at the autosampler. This may use the type of pump common in an LC system or HPLC system. The pumping of the reference sample may be at a volumetric flow rate, Q, to provide substantially laminar flow in view of a kinematic viscosity of the reference sample, ν, a hydraulic diameter, $D_H$, of at least a conduit forming the storage loop, and the cross-sectional area, A, of the conduit forming the storage loop. Laminar flow may be achieved when the Reynolds number, R, for the reference sample is $R=QD_H/\nu A$.

In a still further example, there is apparatus for isotope ratio mass spectrometry, comprising: a mass spectrometer; and the system, as described above, wherein the measurement apparatus is the mass spectrometer; the system being configured to deliver an analyte or a reference substance to a sample input of the mass spectrometer.

In yet another example, there is a method for isotope ratio mass spectroscopy, comprising arranging a system, as described above, in the first configuration for delivery and measurement of the reference sample, wherein the measurement apparatus is a mass spectrometer; arranging the system in the second configuration for delivery and measurement of the analyte, wherein the measurement apparatus is the mass spectrometer; and determining an isotope ratio of the analyte by comparison of a measurement of the analyte sample with a measurement of the reference sample.

The invention claimed is:

1. A system for delivery of an analyte and a reference substance to measurement apparatus, comprising:

an analyte supply, for supplying an analyte sample comprising the analyte;

a reference supply, for supplying a reference sample comprising the reference substance;

an autosampler, having a storage loop into which a fluid can be loaded, the autosampler connected to the analyte supply and connected to the reference supply, the autosampler being switchable between a first configuration and a second configuration, wherein in the first configuration, the analyte sample is loaded into the storage loop, whilst the reference sample passes through the autosampler bypassing the storage loop and being directed towards the measurement apparatus; and in the second configuration, the reference sample is directed through the storage loop of the autosampler to displace the analyte sample loaded in the storage loop and thereby inject the analyte sample towards the measurement apparatus.

2. The system of claim 1, wherein the loop autosampler further comprises:

a valve, wherein the valve is switchable between a first position to enable the first configuration for the autosampler, and a second position to enable the second configuration for the autosampler.

3. The system of claim 2, wherein the valve comprising a plurality of ports, wherein the plurality of ports comprises at least an analyte sample input port connected to the analyte supply, a loop load port, a loop exit port, an analyte sample waste port, a reference sample input port connected to the reference supply, and a delivery port for passage towards the measurement apparatus;

wherein the first position for the valve connects the reference sample input port to the delivery port whilst the analyte sample input port is connected to the loop load port and the loop exit port is connected to the analyte sample waste port; and the second position for the valve connects the reference sample input port to the loop load port and connects the loop exit port to the delivery port, whilst the analyte sample input port is connected to the analyte sample waste port.

4. The system of claim 3, further comprising a pump for pumping the reference sample through the valve at the loop autosampler.

5. The system of claim 4, wherein the pumping of the reference sample is at a volumetric flow rate, Q, to provide substantially laminar flow in view of a kinematic viscosity of the reference sample, ν, a hydraulic diameter, $D_H$, of at least a conduit forming the storage loop, and the cross-sectional area, A, of the conduit forming the storage loop.

6. The system of claim 5, wherein substantially laminar flow is provided at a volumetric flow rate, Q, within 20% or more preferably within 10%, of the volumetric flow rate, Q, at which laminar flow occurs for a reference sample of kinematic viscosity, ν, via a conduit forming the storage loop having hydraulic diameter, $D_H$, and cross-sectional area, A.

7. The system of claim 6, wherein laminar flow is achieved when the Reynolds number, R, for the reference sample is $R=QD_H/\nu A$.

8. The system of claim 1, further comprising:

an analyte reservoir, connected to the analyte supply; and/or a reference reservoir, connected to the reference supply.

9. A method for delivery of an analyte and a reference substance to measurement apparatus, comprising:

switching an autosampler between a first configuration and a second configuration, the autosampler being connected to an analyte supply, supplying an analyte sample comprising the analyte, and the autosampler being connected to a reference supply, supplying a reference sample comprising the reference substance, wherein in the first configuration, the analyte sample is loaded into a storage loop, whilst the reference sample passes through the autosampler bypassing the storage loop and being directed towards the measurement apparatus; and in the second configuration, the reference sample is directed through the storage loop of the autosampler to displace the analyte sample loaded in the storage loop and thereby inject the analyte sample towards the measurement apparatus.

10. The method of claim 9, wherein switching an autosampler between a first configuration and a second configuration comprises switching a valve between a first position to enable the first configuration for the autosampler, and a second position to enable the second configuration for the autosampler.

11. The method of claim 9, further comprising pumping the reference sample through a valve at the autosampler.

12. The method of claim 11, wherein the pumping of the reference sample is at a volumetric flow rate, Q, to provide substantially laminar flow in view of a kinematic viscosity of the reference sample, ν, a hydraulic diameter, $D_H$, of at least a conduit forming the storage loop, and the cross-sectional area, A, of the conduit forming the storage loop.

13. The method of claim 12, wherein laminar flow is achieved when the Reynolds number, R, for the reference sample is $R=QD_H/\nu A$.

14. Apparatus for isotope ratio mass spectrometry, comprising:

a mass spectrometer; and the system according to claim 1, wherein the measurement apparatus is the mass spectrometer;

the system being configured to deliver an analyte or a reference substance to a sample input of the mass spectrometer.

15. A method for isotope ratio mass spectroscopy, comprising:

arranging a system according to claim 1 in the first configuration for delivery and measurement of the reference sample, wherein the measurement apparatus is a mass spectrometer;

arranging the system in the second configuration for delivery and measurement of the analyte, wherein the measurement apparatus is the mass spectrometer; and determining an isotope ratio of the analyte by comparison of a measurement of the analyte sample with a measurement of the reference sample.

* * * * *